(12) United States Patent
Voeltzel

(10) Patent No.: US 7,190,326 B2
(45) Date of Patent: Mar. 13, 2007

(54) CONDUCTIVE FREQUENCY SELECTIVE SURFACE UTILIZING ARC AND LINE ELEMENTS

(75) Inventor: Charles S. Voeltzel, New Kensington, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 21 days.

(21) Appl. No.: 11/093,523

(22) Filed: Mar. 30, 2005

(65) Prior Publication Data

US 2006/0267856 A1 Nov. 30, 2006

Related U.S. Application Data

(62) Division of application No. 10/409,518, filed on Apr. 8, 2003, now Pat. No. 6,891,517.

(51) Int. Cl.
*H01Q 15/02* (2006.01)
*H01Q 1/32* (2006.01)

(52) U.S. Cl. .................... 343/909; 343/713; 343/704

(58) Field of Classification Search ............ 343/909, 343/711, 712, 713, 704, 700 MS
See application file for complete search history.

(56) References Cited

U.S. PATENT DOCUMENTS

| 4,587,769 A | 5/1986 | Cathers ............... 51/165.87 |
| 5,492,750 A | 2/1996 | Shumaker, Jr. et al. ..... 428/192 |
| 6,441,792 B1 * | 8/2002 | Sievenpiper et al. ........ 343/713 |
| 6,496,138 B1 * | 12/2002 | Honma ....................... 342/70 |
| 6,891,517 B2 * | 5/2005 | Voeltzel ..................... 343/909 |
| 6,922,175 B2 | 7/2005 | Walton ....................... 343/713 |

* cited by examiner

*Primary Examiner*—Hoanganh Le
(74) *Attorney, Agent, or Firm*—Andrew C. Siminerio

(57) ABSTRACT

An electrically conductive coating of an automotive heatable windshield has a communication window having an enhanced frequency selective surface having arranged passing areas (uncoated areas) and blocking areas (coated areas) to pass and block, respectively, predetermined wavelengths of the electromagnetic spectrum. In one nonlimiting embodiment, the frequency selective surface includes a plurality columns spaced from one another by a continuous elongated blocking area. Each of the columns includes passing areas with each of the passing areas have a perimeter with a blocking area in the perimeter spaced from the perimeter. The perimeters of the passing areas contact one another with the blocking area of adjacent passing areas spaced from one another. The elongated blocking area between the break lines and columns extend to the perimeter of the communication window. In this manner current passing through the coating, passes through the communication window to eliminate hot and cold spots around and within the perimeter of the communication window.

22 Claims, 5 Drawing Sheets

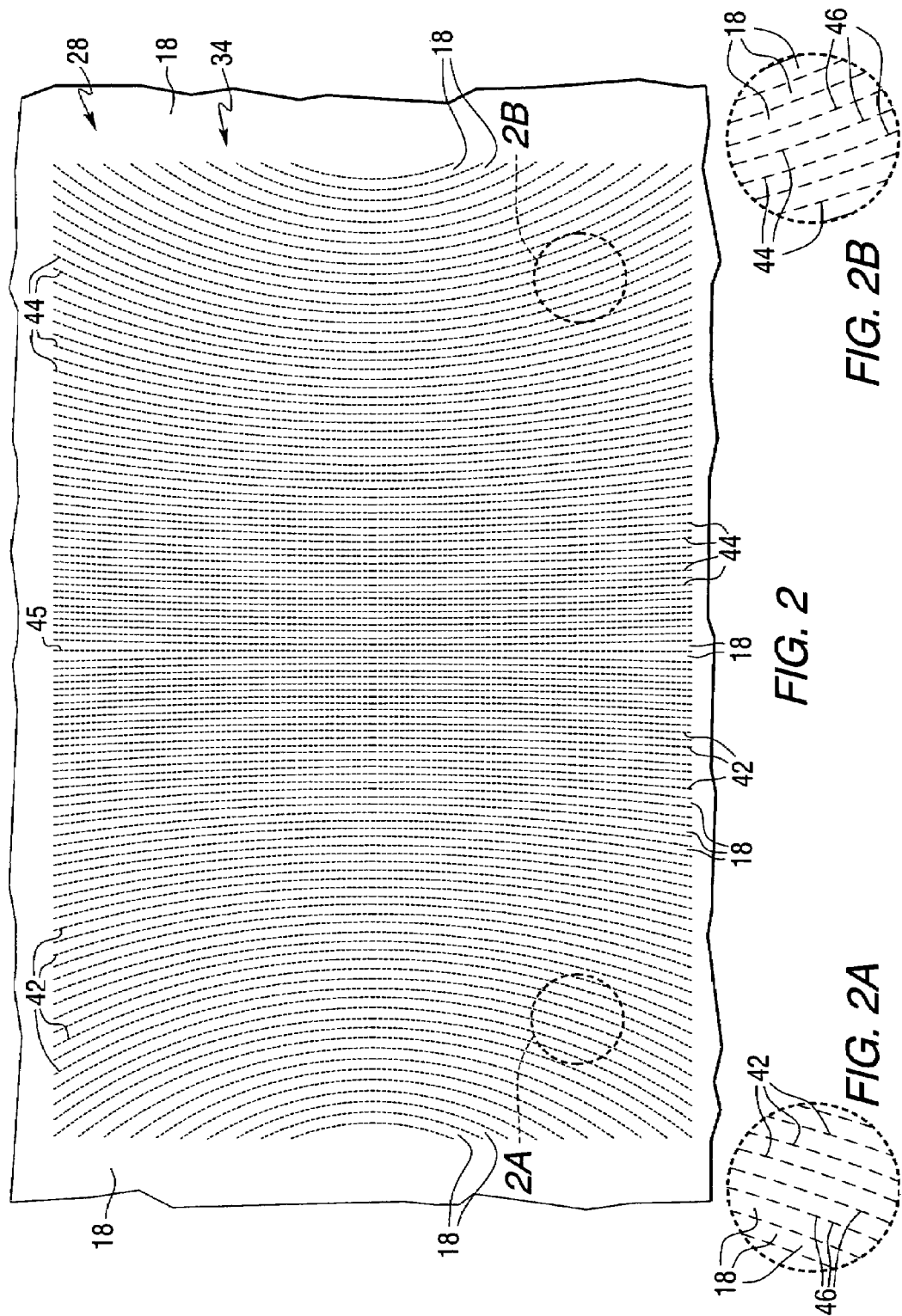

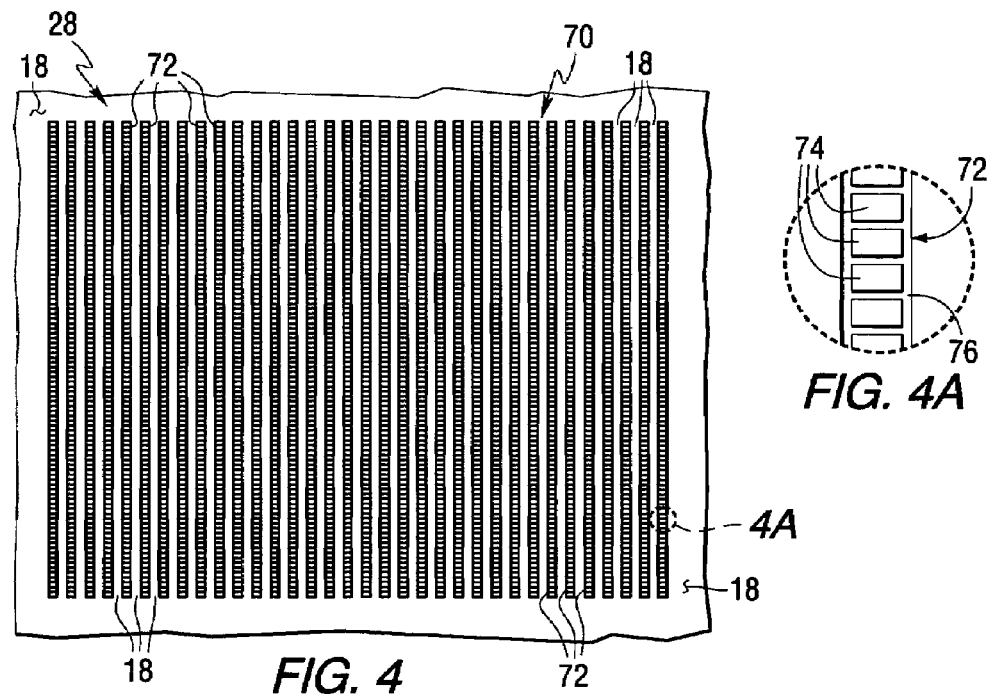
FIG. 4
FIG. 4A
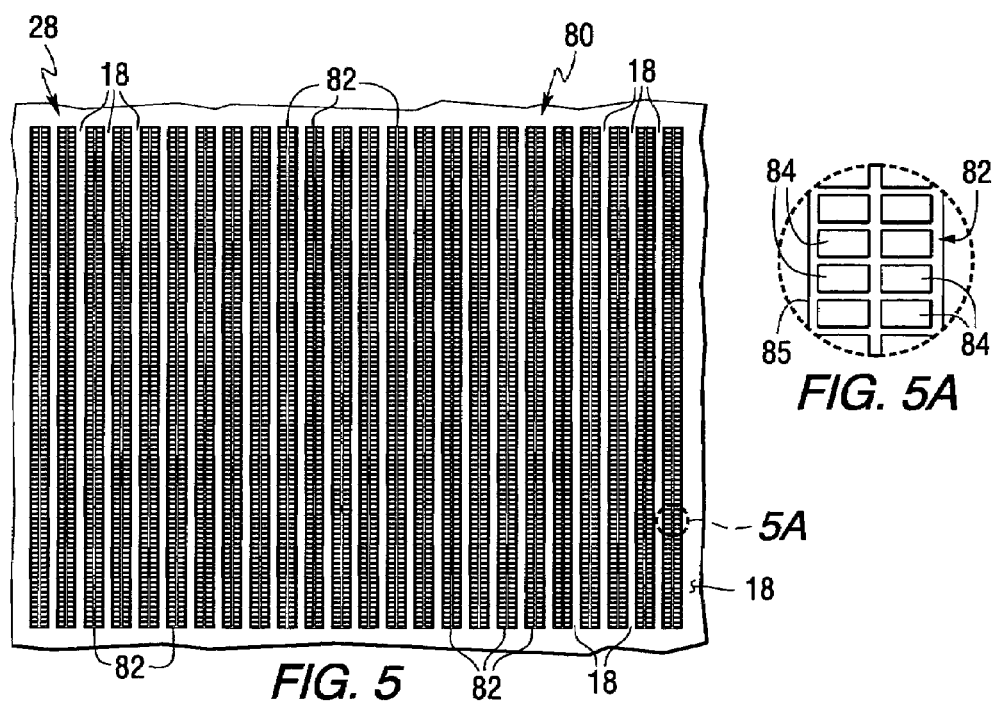
FIG. 5
FIG. 5A

CONDUCTIVE FREQUENCY SELECTIVE SURFACE UTILIZING ARC AND LINE ELEMENTS

RELATED APPLICATIONS

This is a divisional of U.S. patent application Ser. No. 10/409,518 filed Apr. 8, 2003, now U.S. Pat. No. 6,891,517B2.

The interlayer composite disclosed in U.S. patent application Ser. No. 10/201,863 filed Jul. 24, 2002, in the names of Bruce Bartrug, Allen R. Hawk, Robert N. Pinchok and James H. Schwartz for "Edge Sealing Of A Laminated Transparency" now U.S. Pat. No. 6,791,065; the bus bar arrangement disclosed in U.S. patent application Ser. No. 10/201,864 filed Jul. 24, 2002, in the name of Allen R. Hawk for "Eliminating Hot Spots At End Portions Of Bus Bars Of A Heatable Transparency Having An Electrically Conductive Member" now U.S. Pat. No. 6,791,066B2; the heatable article disclosed in U.S. patent application Ser. No. 10/264,106 filed on Oct. 3, 2002, in the name of Charles S. Voeltzel for "Heatable Article Having a Configured Heating Member", and the techniques to impede edge corrosion of a laminated coated article disclosed in U.S. patent application Ser. No. 10/353,566 filed Jan. 29, 2003, in the names of Glenn E. Freeman, Robert C. Lewetag and James P. Thiel for "A Coated Article Having A Sealed Layered Edge To Impede Corrosion Of A Coating Of The Edge And Method Of Making Same", can be used in the practice of this invention. The applications identified above in their entirety are hereby incorporated by reference.

BACKGROUND OF THE INVENTION

1. Field of the Invention

This invention relates to an article having a metallized surface, e.g. a substrate having an electrically conductive surface with a frequency selective surface designed to pass selected frequencies of the electromagnetic spectrum, and more particularly, to a transparency, e.g. an automotive windshield having an electrically heatable coating and a frequency selective surface formed in the coating, the frequency selective surface designed to pass selected radio frequencies with little or no attenuation while reducing the intensity of hot and cold spots around the a frequency selective surface.

2. Discussion of the Technology

Automotive heatable windshields, e.g. of the type disclosed in U.S. Pat. No. 4,820,902, include two glass sheets laminated together by a plastic interlayer, usually a sheet of polyvinyl butyral ("PVB"). A pair of spaced bus bars between the glass sheets are in electrical contact with an electrically conductive member, and each bus bar is electrically accessible by an external lead to pass current from a power source through the bus bars and the conductive member to electrically heat the conductive member and conductively heat the inner and outer surfaces of the windshield. The heated windshield surfaces attain a temperature sufficient to remove fog and melt snow and ice.

For a general discussion of heatable windshields reference can be had to U.S. Pat. Nos. 3,789,191; 3,789,192; 3,790,752; 3,794,809; 4,543,466, and 5,213,828.

The electrically conductive member of heatable windshields is usually a sputtered electrically conductive coating applied to a major surface of one of the glass sheets and usually includes one or more conductive films, e.g. silver films, with each of the conductive films between a pair of dielectric films. The silver film in addition to passing current also reflects infrared energy. When there are no facilities to move current through the conductive coating, the coating functions as a solar control coating; when there are facilities to move current through, and current moves through the coating, the coating is heated and further functions as a heatable coating. Coatings of the type discussed above are disclosed in European Patent Application No. 00939609.4.

The electrically conductive and/or solar control coatings are usually provided with an area or aperture to pass frequencies of the electromagnetic spectrum. More particularly, modern day communication is heavily dependent on the transmission of RF signals to pass information into the interior of vehicles, e.g. to pass signals to AM/FM radios, CB radios, cellular phones, and/or to obtain information from the interior of the vehicle, e.g. to obtain information for global positioning systems, automatic toll collection transponders, radar systems, and various other satellite systems operated using RF communication, and/or to energize systems, e.g. rain sensors and lighting circuits. Accordingly, there is a need to adapt the transparencies such as automotive windshields to permit the transmission of RF signals. One adaptation is to leave an uncoated area in the coating. For example, the 1990–1995 Chevrolet Corvette ZR-1 was offered with windshield having a solar control coating. An uncoated area was provided at the bottom center of the windshield. The manual provided by the car manufacturer informed the car user that the specially-treated windshield would decrease the effective distance of some add-on electronic devices, such as garage door openers, and provided instructions that if such a device is used it should be aimed through the uncoated area.

In the instance when the coating functions only as a solar control coating, the uncoated area has a higher visible light transmission and is noticeable, i.e. aesthetically unacceptable. In the instance when the coating is an electrically heatable coating, the uncoated area is not heated, leaving ice and snow on the windshield in the region of the uncoated area and creating hot and cold spots around the perimeter of the uncoated area due to localized high current or low current regions.

Since 1990, improvements have been made to overcome the drawbacks associated with having an uncoated aperture in heatable and/or solar control coatings. One of the improvements is to provide a frequency selective surface, i.e. a pattern in the communication window that has selected portions of the coating removed to pass electromagnetic waves having at least one predetermined operating frequency or frequency range and block, to the extent any metal or insulating sheet blocks, other frequencies. One such frequency selective surface is a patch array. Frequency selective surfaces require removal of a small percentage of the coating thereby maintaining the aesthetics of the windshield. Frequency selective surfaces are discussed in U.S. Pat. Nos. 3,633,206; 3,789,404; 3,961,333; 3,975,738; 4,126,866; 4,301,456; 4,479,131; 4,656,487; 4,851,858; 5,208,603; 5,311,202; 5,364,685, and 5,528,249 and WO 96/31918 and in Krause "Antennas", "Slot, Horn, and Complementary Antennas" pp 353–371, First Edition, McGraw-Hill, 1950.

Although the presently available frequency selective surfaces reduce the difference between the visible light transmission of the coating and the aperture making the windshield aesthetically acceptable, they have not eliminated the drawbacks of using the frequency selective surface with heatable coatings. More particularly, frequency selective surfaces such as patch arrays are provided in the aperture spaced from the coating and do not provide for current to move through a frequency selective surface in the aperture. When the coating is energized to remove snow and ice, the frequency selective surface is not heated, leaving ice and snow on the windshield in the region of the a frequency selective surface and creating hot and cold spots around the perimeter of the aperture.

As can be appreciated by those skilled in the art, it would be advantageous to provide frequency selective surfaces that can be used with heatable coatings and do not have the drawbacks of the presently available frequency selective surfaces and that pass radio waves of selected frequencies and polarization with little attenuation.

SUMMARY OF THE INVENTION

This invention relates to an article having a substrate, e.g. a transparency, for use on an enclosure of the type selected from a residential home, a commercial building, a space vehicle, an air vehicle, a land vehicle, an over the water vehicle, an under the water vehicle, a refrigerator door having a window, an oven door having a window, a microwave door having a window, and combinations thereof. The substrate has a major surface having a portion to block out at least one predetermined wavelength of the electromagnetic spectrum, e.g. a solar control coating, an electrically heatable coating and combinations thereof having a metal film, e.g. a silver film. A portion of the coating is outlined by an imaginary boundary, also referred to as an aperture, having a frequency selective surface within the imaginary boundary or aperture. The pattern of the frequency selective surface is defined by arrangement of areas that pass the at least one predetermined wavelength of the electromagnetic spectrum, defined as passing areas, e.g. uncoated areas, and areas that block out the at least one predetermined wavelength of the electromagnetic spectrum, defined as blocking areas, e.g. coated areas. The combination of the imaginary boundary or aperture and a frequency selective surface is also referred to as a communication window.

In one nonlimiting embodiment of the invention, the communication window includes a frequency selective surface having a plurality of columns separated from one another by a blocking area. Each column has a plurality of passing areas and blocking areas arranged in the following manner. The passing areas contact one another with each passing area having a perimeter with a blocking area within the perimeter and spaced from the perimeter of the passing area.

In another embodiment of the invention, each column includes two subcolumns, with each subcolumn having a plurality of passing areas having blocking areas arranged as discussed above. The passing areas of each subcolumn are in contact with one another and the blocking areas within the perimeter of the passing areas are spaced from one another. The columns are spaced from one another by a blocking area.

In still another embodiment of the invention, the aperture of the communication window has a rectangular shape having a length of 150 mm, and a height of 100 mm, and the frequency selective surface of the communication window is selected from one of the following groups:

Group 1: The columns are spaced 1 mm apart and have a width of 1 mm. The blocking areas, e.g. the coated areas within the columns, are spaced from each other and the blocking area formed by the coating between the columns a distance of 100 microns;

Group 2: The columns are spaced 2 mm apart and have a width of 1 mm. The blocking areas, e.g. the coated areas within the columns, are spaced from each other and the blocking area formed by the coating between the columns a distance of 100 microns; and Group 3: The columns are spaced 2 mm and have a width of 2 mm. Each column has two subcolumns having the blocking areas, e.g. the coating areas surrounded by passing areas, e.g. uncoated areas. The edges of the blocking areas within the columns are spaced from adjacent blocking areas within the columns and the blocking areas between the columns a distance of 100 microns.

In a further embodiment of the invention, the blocking area between a pair of adjacent columns is continuous from (1) a first location on the imaginary boundary of the communication widow and in contact with the portion of the major surface to block out the at least one predetermined wavelength of the electromagnetic spectrum, e.g. the coating, to (2) a second location on the imaginary boundary and in contact with the portion of the surface to block out the at least one predetermined wavelength of the electromagnetic spectrum with the first location spaced from the second location. In this manner, when the coating is a heatable coating current moves through the frequency selective surface to eliminate hot and cold spots around and in the aperture of the communication window.

The columns of the nonlimiting embodiments of the invention discussed above can pass radio waves of selected frequencies and polarizations with little attenuation, e.g. see FIGS. 6 and 7.

The above embodiments of the invention are not limiting to the invention, and the invention contemplates, but not limiting the invention thereto, practicing the embodiments of the invention with the following concepts:

Concept 1. A windshield having a first glass sheet with the coating on a major surface of the first glass sheet and the communication window in a predetermined location in the coating; a second glass sheet having a major surface, and a plastic interlayer between the major surfaces of the first sheet and the second sheet securing the first and second sheets together.

Concept 2. A coating having one or more silver films with a dielectric film between the silver films.

Concept 3. A windshield having a pair of spaced bus bars between the sheets and in electrical contact with the coating. A first lead contacts one of the bus bars and extends out from a peripheral edge of the windshield and a second lead contacts the other bus bar and extends out beyond the peripheral edge of the windshield to proved external electrical contact to the bus bars. The communication window is oriented such that the blocking area between adjacent columns of the frequency selective surface is oriented in the direction of current flow between the bus bars.

Concept 4. A coating having a first plurality of deletion lines spaced from one another and extending from one bus bar defined as a first bus bar toward the communication window and a second plurality of deletion lines in the coating spaced from one another and extending from to the other bus bar defined as a second bus bar toward the communication window, with the first and second plurality of deletion lines generally aligned with one anther. Selected ones of the first plurality of deletion lines and selected ones of the second plurality of deletion lines have a path around one side of the communication window defined as the first side and are in contact with one another to provide continuous spaced current paths from the first bus bar to the second bus bar around the first side of the communication window and selected ones of the first plurality of deletion lines and selected ones of the second plurality of deletion lines have a path around opposite side of the communication window defined as the second side and are in contact with one another to provide continuous spaced current paths from the first bus bar to the second bus bar around the second side of the communication window.

Concept 5. A windshield having a hydrophobic coating on a major surface of the windshield and/or a photocatalytic coating on an outer major surface of the windshield.

Concept 6. A laminated windshield having at least two glass sheets and a plastic interlayer, wherein at least one of the glass sheets or the plastic interlayer have a wedged shaped cross section.

BRIEF DISCRIPTION OF THE DRAWING

FIG. 2 is a plan view of a coating incorporating a nonlimiting frequency selective surface ("FSS") having arcuate shaped segmented break lines, incorporating features of the invention. Inserts 2A and 2B illustrate particulars of the break lines of the FSS pattern of FIG. 2.

FIGS. 4 and 5 are views similar to the view of FIG. 2 showing additional nonlimiting embodiments of FSSs incorporating features of the invention, having spaced columns. Inserts 4A and 5A in FIGS. 4 and 5, respectively, illustrate particulars of the deletion lines of the FSS patterns of FIGS. 4 and 5, respectively.

Figure 6:
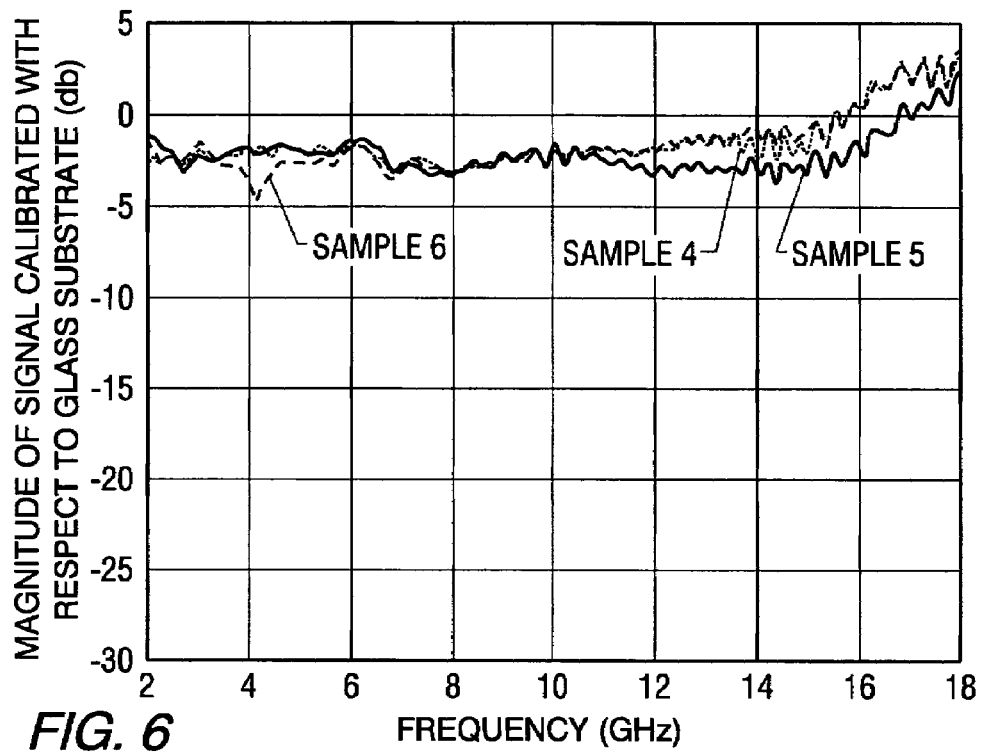
Figure 7:
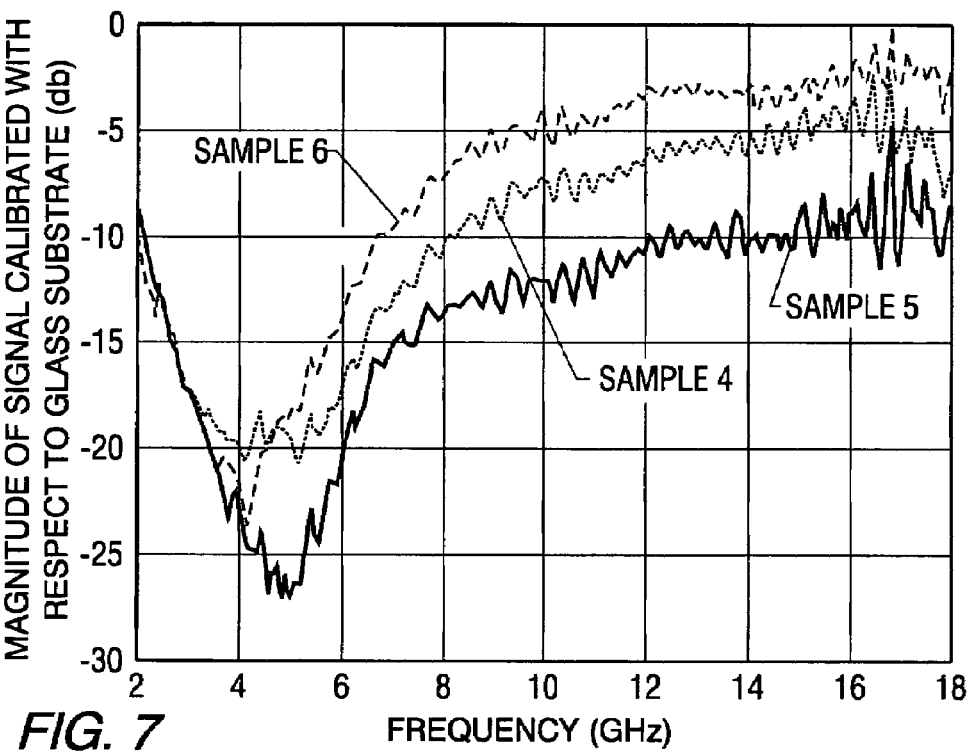

FIGS. 6 and 7 are graphs showing the performance of FSS patterns of the type shown in FIGS. 4 and 5.

Figure 1:
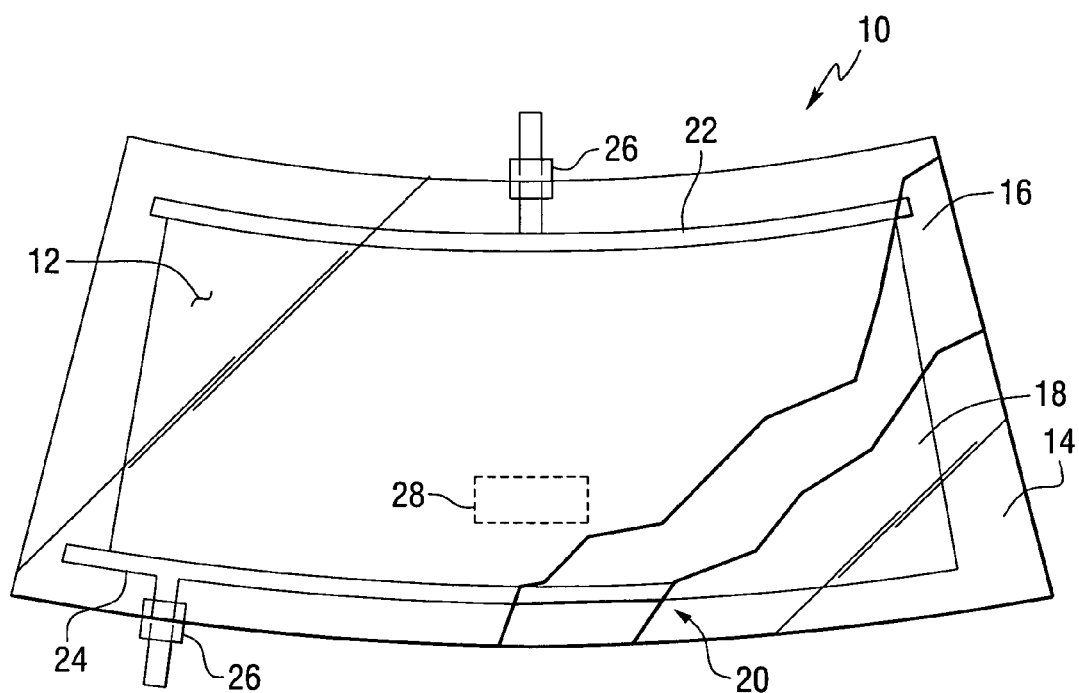
FIG. 1 is a plan view of an automotive windshield incorporating features of the invention.
Figure 8:
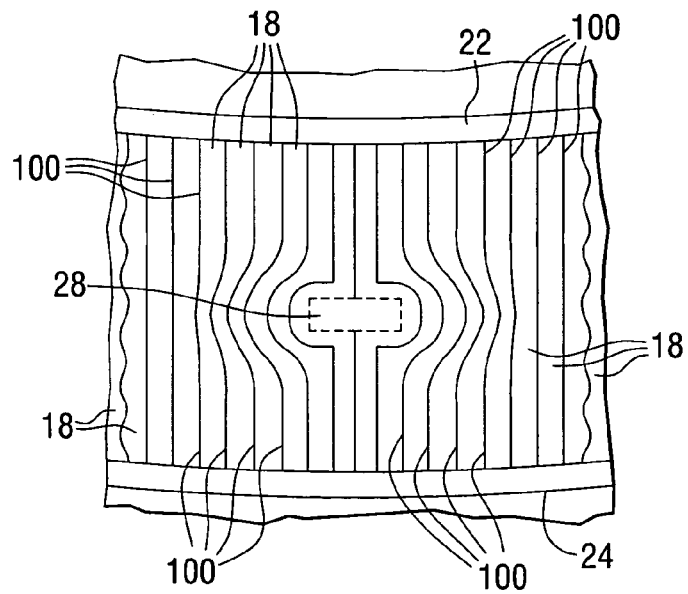

FIG. 8 is a fragmented view of an alternate embodiment of the windshield shown in FIG. 1 showing a communication window and additional deletion lines, incorporating features of the invention.

DETAILED DESCRIPTION OF THE INVENTION

Before discussing the nonlimiting embodiments of the invention, it is understood that the invention is not limited in its application to the details of the particular embodiments shown and discussed since the invention is capable of other embodiments. Further the terminology used herein is for the purpose of description and not of limitation.

As used herein, spatial or directional terms, such as "inner", "outer", "left", "right", "up", "down", "horizontal", "vertical", and the like, relate to the invention as it is shown in the drawing figures. However, it is to be understood that the invention can assume various alternative orientations and, accordingly, such terms are not to be considered as limiting. Further, all numbers expressing dimensions, physical characteristics, and so forth, used in the specification and claims are to be understood as being modified in all instances by the term "about". Accordingly, unless indicated to the contrary, the numerical values set forth in the following specification and claims can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.5, and ending with a maximum value of 10 or less, e.g., 5.5 to 10. Also, as used herein, the terms "deposited over", "applied over", or "provided over" mean deposited, applied, or provided on but not necessarily in surface contact with. For example, a material "deposited over" a substrate does not preclude the presence of one or more other materials of the same or different composition located between the deposited material and the substrate.

In the following discussion of the invention and in the claims, the term "aperture" and "imaginary boundary" is defined as an area having a "frequency selective surface". In the following discussion of the invention and in the claims, the term "frequency selective surface", also referred to as "FSS" and "frequency selective surface pattern", are defined as a surface (a) having nonlimiting patterns embodying features of the invention which are capable of passing electromagnetic waves having at least one predetermined operating frequency and/or range, (b) optionally has a surface area sufficient to contact portions of the perimeter of the aperture or the imaginary boundary at two spaced locations, and (c) is capable of passing current from one point on the perimeter of the aperture or the imaginary boundary through the frequency selective surface to a second point on the perimeter of the aperture or the imaginary boundary spaced from the first point. In the following discussion of the invention and in the claims, "communication window" also referred to as "CW" is defined as an "aperture" or imaginary boundary" having a "frequency selective surface". It is to be understood that the term "frequency selective surface" is not limited to any pattern and/or design and the terms "communication window", "aperture" or "imaginary boundary" is not limited to any size and/or configuration. Further, the FSS and/or the CW can be applied to any type of transparent, opaque or translucent metal panel and/or substrate having a metallized surface, e.g. but not limiting the invention thereto, a metal coating or a coating having a metal film. Further and as can be appreciated by those skilled in the art, the current moving from the first point to the second point spaced from the first point can travel on the surface and/or through the body of the conductive material, e.g. conductive coating or film forming the FSS.

In the following discussion, the invention will be described for use on vehicular transparencies, e.g. an automotive windshield having a communication window. As will be appreciated, the invention is not limited thereto, and the invention can be practiced on transparencies for any type of vehicles such as, but not limiting the invention thereto, land vehicles such as, but not limiting the invention thereto, trucks, cars, motorcycles, and/or trains, to air and/or space vehicles, and to above and/or below water vehicles. Further, the invention can be any type of a vehicular transparency such as, but not limiting the invention thereto, an automotive windshield, a monolithic or laminated automotive sidelight, e.g. of the type disclosed in European Patent Application No 00936375.5, which document in its entirety is hereby incorporated by reference, a moon roof and a rear window. Still further, the invention can be practiced on windows for residential homes, commercial buildings, oven doors, microwave ovens and refrigerator doors.

As can now be appreciated, although the frequency selective surface of the invention in one nonlimiting embodiment of the invention is discussed with an electrical conductive member, the enhanced frequency selective surface of the invention can be used with a coating or layer that functions only as a solar control coating or layer.

With reference to FIG. 1 there is shown an automotive windshield 10 incorporating features of the invention. The windshield 10 includes a pair of glass sheets or blanks 12 and 14, secured together by a plastic sheet 16 of the type used in the art of fabricating automotive windshields or laminating glass sheets, e.g. PVB, polyvinyl chloride ("PVC") or polyurethane. An internal electrically conductive member 18 is mounted on the inner surface of one of the sheets 12 or 14, e.g. sheet 14 as shown in FIG. 1. In the following discussion of the windshield 10, the sheet 14 is the inner sheet as the windshield is mounted in the vehicle with the internal conductive member 18 on the inner surface of the inner sheet 14 also referred to as the No. 3 surface of the windshield as mounted or as to be mounted. As can be appreciated, the invention is not limited to the surface of the windshield on which the internal conductive member is applied, e.g. the internal member can be applied to the inner surface of the outer sheet of the windshield, e.g. the No. 2 surface of the windshield. Further, the conductive member can be continuous as shown in FIG. 1 or can have deleted portions for more uniform heating of the windshield surfaces, e.g. disclosed in the above-mentioned U.S. patent application Ser. No. 10/264,106 filed on Oct. 3, 2002.

As can be appreciated by those skilled in the art, the invention is not limited to the composition of the glass sheets 12 and 14. More particularly, the glass sheets can be clear or tinted glass, for example but not limited to, glasses of the type disclosed in U.S. Pat. Nos. 5,030,592; 5,240,886, and 5,593,929 which patents are hereby incorporated by reference. The glass sheets can be annealed, tempered or heat strengthened. Glass sheets used in the manufacture of windshields are generally annealed glass sheets. The glass sheets can have uniform thickness or can be wedged as viewed in cross section as disclosed in U.S. Pat. No. 5,812,332, which document in its entirety is hereby incorporated by reference. The glass sheets can be soda-lime-silicate glass or borosilicate glass or any type of refractory glass.

In the following discussion of a nonlimiting embodiment of the invention, the plastic sheet 16 is a component of an interlayer composite 20 of the type disclosed in the above-mentioned U.S. patent application Ser. No. 10/201,863 filed on Jul. 24, 2002. In general and not limiting to the invention, the interlayer composite 20, includes a top bus bar 22 and bottom bus bar 24 each mounted on the plastic sheet 16, e.g. by adhesive (not shown), such that the bus bars are in electrical contact with the internal conductive member 18 when the plastic sheet 16 is laminated between sheets 12 and 14. A lead assembly 26 connected to each bus bar connects the leads to an external power source (not shown) to move current between the sheets 12 and 14, through the bus bars and the conductive member 18, to heat the windshield.

As can now be appreciated the invention is not limited to the material of the conductive member 18 or method of applying the conductive member 18 to the surface of the glass sheet 14. For example, but not limiting the invention thereto, the conductive member can be a conductive sheet, e.g. a metal sheet or foil, or a conductive coating or film. The metal foil can be applied to the glass sheet in any manner, e.g. with adhesive. The conductive coating can be applied in any manner, e.g. sputter coating, pyrolytic coating, painting or plating, e.g. submerging the glass in an electric or electroless coating bath. As previously mentioned, the invention is practiced on an automotive windshield; therefore the conductive member should provide sufficient visibility to meet the current transmission requirement for automotive windshields. The conductive member in the following discussion of the nonlimiting embodiment of the invention is a sputtered transparent coating of the type having one or more combinations of a metal film and a dielectric film. In a nonlimiting embodiment of the invention, the metal film is a silver film. Sputtered coatings usually include one or more layers of a dielectric film, e.g. zinc oxide, tin oxide, oxides of a zinc-tin alloy or films of tin oxide doped with zinc oxide over and/or under the major surfaces of the metal films. When sputter coating a dielectric film, e.g. an oxide of a metal over a silver film, the usual practice is to deposit a sacrificial film, e.g. a titanium film, over the silver film to prevent oxidation of the silver as the dielectric film is deposited. The sacrificial metal film usually is converted to an oxide of the metal, e.g. titanium oxide or dioxide. Sputter coatings that can be used in the practice of the invention, include but not limiting thereto, electrically heatable coatings and/or solar control coatings of the type discussed in U.S. Pat. No. 5,364,685 and European Patent Application No. 00939609.4, which documents in their entirety are hereby incorporated by reference.

It is the usual practice, but not limiting to the invention, when using a sputtered type coating that includes a silver film, to provide discontinuities in the silver film at the marginal edges of the glass sheet as disclosed in the above-mentioned U.S. patent application Ser. No. 10/353,566 filed on Jan. 29, 2003, to terminate the coating short of the edges of the glass sheet on which it is applied, e.g. by deleting the coating e.g. as disclosed in U.S. Pat. No. 4,587,769 or using a mask during sputtering e.g. as disclosed in U.S. Pat. No. 5,492,750. Discontinuities in the silver or deleting the coating from the marginal edges of the glass sheet provides an edge seal that minimizes or prevents corrosion of the silver at the marginal edge of the laminate. The entire disclosures of U.S. Pat. Nos. 4,587,769 and 5,492,750 are hereby incorporated by reference.

With continued reference to FIG. 1, the conductive member or coating 18 includes a communication window 28 incorporating features of the invention. The aperture of the communication window 28 is shown in FIG. 1 by dotted lines to indicate that the frequency selective surface of the communication window and the conductive coating surrounding the aperture of the communication window are in electrical contact with one another. The frequency selective surface of the invention is not illustrated in FIG. 1; several nonlimiting embodiments of the frequency selective surface of the invention are shown in FIGS. 2–5 and are discussed below. The communication window 28 shown in FIG. 1 is shown in the center of the bottom portion of the windshield; the invention, however, is not limited thereto, and the communication window can be at any location on the windshield, e.g. top portion, bottom portion, right portion, and left portion or center portion. Further the invention is not limited to the configuration of the outline of the aperture of the communication window or of the frequency selective surface of the communication window which includes but is not limited to circles, squares, rectangles, trapezoids, etc. Still further the invention is not limited to the size of the aperture or the frequency selective surface. Although in the nonlimiting embodiment of the invention shown in FIG. 1 only one communication window is shown, as can be appreciated more than one communication window can be provided in the coating 18 depending on the number and type of devices to be actuated or acted on by passing frequencies or ranges of frequencies of the electromagnetic spectrum through the windshield.

The discussion will now be directed to nonlimiting patterns or configurations of frequency selective surfaces of the invention to pass selected frequencies or ranges of the electromagnetic spectrum while providing a current flow through the frequency selective surface to, among other things, minimizing if not eliminate hot spots and cold spots around the communication window and provide current to heat the portion of the windshield having the communication window.

With reference to FIG. 2, there is shown the communication window 28 having nonlimiting FSS or FSS pattern 34 of the invention. The pattern 34 includes a plurality of spaced break lines 42 and 44 on each side of a dividing or center break line 45. The number 42 designates the break lines on the left side of the center break line 45, and the number 44 designates the break lines on the right side of the center break line 45, as shown in FIG. 2. Although not required, in the particular embodiment shown in FIG. 2, the lines forming each set of break lines 42, 44 are nested together, i.e. the lines fit closely together. With reference to inserts 2A and 2B as needed, each of the break lines 42 and 44 have a plurality of spaced uncoated or deleted segments 46 to provide the pattern 34 with a plurality of voids to pass electromagnetic signals of a predetermined frequency or range. The center break line 45 has spaced uncoated segments similar to the uncoated segments of the break lines 42 and 44. Portions of the coating 18 are between the break lines 42 and 44, center break line 45 and the uncoated segments 46 of the break lines 42 and 44 and center break line 45. In this manner continuous portions of the coating 18 extend through the FSS to provide a current path through the communication window to heat the frequency selective surface of the communication window and to eliminate or reduce the intensity of the hot and cold spots around the aperture of the communication window when the heatable coating is energized.

In the nonlimiting embodiment of the FSS pattern 34 of FIG. 2, the break lines 42 are each arcuate break lines having a radius of curvature from a predetermined point or center (not shown) in space that ranges from greater than zero to infinity, e.g. a straight line. The center for the plurality of break lines 42 is to the left of the center break line 45, and the center for the plurality of break lines 44 is to the right of the center break line 45, as viewed in FIG. 2. In general, the radius of curvature of a break line of the plurality of break lines 42 or 44 decreases as the distance from the center break line 45 increases. Stated another way, the radius of curvature of a break line of a plurality of break lines 42 or 44 closer to the center (not shown) of the plurality of break lines has a smaller radius of curvature than the radius of curvature of a break line of the same plurality of break lines 42 or 44 farther from the center.

Figures 3, 3A, 3B:
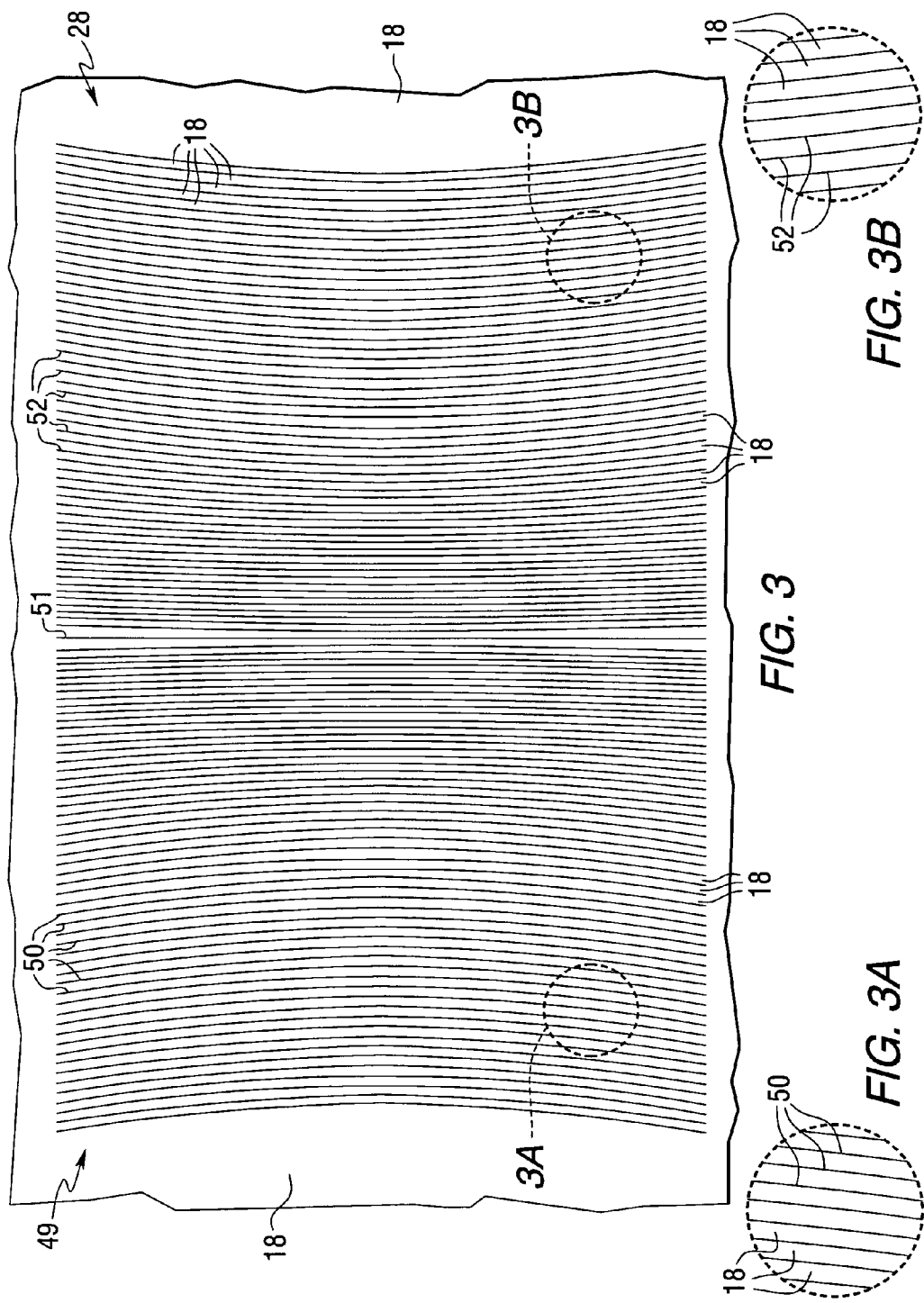
FIG. 3 is a view similar to the view of FIG. 2 of another nonlimiting frequency selective surface having arcuate shaped continuous break lines, incorporating features of the invention. Inserts 3A and 3B illustrate particulars of the break lines of the FSS of FIG. 3.

With reference to FIG. 3, there is shown another nonlimiting FSS of the invention. FSS or FSS pattern 49 shown in FIG. 3 includes arcuate break lines 50 on the left of center break line 51 and arcuate break lines 52 on the right side of the center break line 51. The arcuate break lines 50 and 52 and the center break line 51 are void of the coating 18 along their entire length. Although not required, in the particular embodiment shown in FIG. 3, the lines forming each set of break lines 50, 52 are nested together, i.e. the lines fit closely together.

In other nonlimiting FSSs or FSS patterns of the invention, the center break line 45 and 51 is omitted from the FSS patterns 34 and 49, respectively. In still other nonlimiting embodiment of the invention, the FSS pattern includes a mixture of break lines 42 and 50 from FSS patterns 34 and 49, respectively, and/or a mixture of break lines 44 and 52 of FSS patterns 34 and 49, respectively, with or without center break line 45 or 51, respectively.

The uncoated segments 46 of the FSS pattern 34 and the uncoated break lines 50, 51 and 52 of the FSS pattern 49 are voids in the coating 18 that can extend through the coating, can be provided only in the metal film(s) of the coating or can extend through the coating to a depth equal to the depth of the metal film(s) of the coating closest to the glass sheet, to form passing areas. Stated another way the uncoated segments are voids that extend through at least all portions of the metal films, e.g. but not limiting to the invention, the silver film and any sacrificial metal film not converted to its oxide. Although in one embodiment of the invention the voids extend through the metal film, it can be appreciated that removing portions of the metal film, e.g. using a laser, can leave a metal residue in the voids. It has been determined that metal reside does not adversely effect the signal filtering properties of the frequency selective surface of the present invention.

As can be appreciated the invention is not limited to the shape of the break lines of the FSS patterns 34 and 49. More particularly, the break lines can be arcs, ellipses, and brackets to name a few of the shape that the break lines 42 and 44, and 50 and 52 can have. Furthermore, although the arcuate lines 42, 44, 50 and 52 are discussed above in terms of having a radius of curvature, it should be appreciated that these arcuate lines are not limited to lines having a constant radius of curvature, i.e. lines that are arcs of a circle. More particularly, the break lines can have other curved configurations, such as but not limited to lines having multiple radii, spiral configurations and splines, to name a few. It should be further appreciated that with respect to the particular nonlimiting embodiments shown in FIGS. 2 and 3 and discussed above, when it is stated that a break line has a greater or increasing curvature, the line is becoming less straight and is the same as stating that the break line has a smaller or decreasing radius of curvature. Similarly, when it is stated that a break line has a smaller or decreasing curvature, the line is becoming straighter and is the same as stating that the break line has a greater or increasing radius of curvature Further, the invention is not limited to the spacing between adjacent break lines of a plurality of break lines. For example but not limiting to the invention, the spacing between adjacent break lines of a plurality of break lines can be uniform, can increase as the distance to the center break line 45 or 51 increases as shown in FIG. 2 or 3, respectively; can have a plurality of break lines of a uniform spacing and other groups of the break lines of non uniform spacing or of a different uniform spacing. As can be appreciated, as the width of the uncoated segments 46 shown in FIG. 2 increases and/or the distance between the break lines 42, 44 and 45 of FIG. 2 and/or the break lines 50, 51 and 52 of FIG. 3 decrease, the area of the coating 18 within the FSS patterns 34 and/or 49 decreases, thus limiting the voltage going through the FSS pattern and increasing the temperature and area of hot spots around the FSS pattern, and vice versa.

As can further be appreciated, the FSS pattern of the invention can have all straight lines or all arcuate lines all based on a common center. The straight break lines can be in any direction and the center for the arcuate break lines can extend in any direction, e.g. vertical, horizontal or diagonal. For example, but not limiting to the invention, the center break line 45 can be a vertical line as the windshield is mounted in the vehicle with the plurality of break lines to the right and left of the vertical center break line, or the center break line 45 can be horizontal as the windshield is mounted with the group pf break lines on top of and below the horizontal center break line 45.

Although not limiting to the invention, in one nonlimiting embodiment bus bars are positioned above and below the FSS patterns 34 and 51 as shown in FIGS. 2 and 3, respectively, for the current to flow between the break lines. However as can be appreciated, the invention contemplates any orientation between the bus bars and the FSS patterns 34 and 51, e.g. a bus bar can be to the left and right of the FSS patterns 34 and 51 shown in FIGS. 2 and 3, respectively.

Using FIG. 2 as a reference for the following discussion, but not limiting the discussion or the invention thereto, e.g. the discussion can be applied to the FSS of FIG. 3, the frequency and magnitude of the electromagnetic signal passing through the communication window is believed to be a function of the following parameters: space between adjacent break lines of the plurality of break lines 42, 44 and 45; the radii of the break lines of the plurality of break lines 42 and 44; the area of the FSS; the length of the uncoated segments 46 of the break lines 42 and 44; the width of the uncoated segments 46 of the break lines 42 and 44 and the spacing between adjacent uncoated segments 46 of a break line. Due to the complexity of the patterns, the frequency response is difficult to predict; however, it is believed that the following interaction between parameters can be expected. As the space between adjacent break lines of the plurality of break lines 42 and 44 increases, i.e. decreasing the number of lines in the group while keeping the remaining parameters constant, decreases the magnitude of the signal and vice versa. Increasing the radii of the break lines of the plurality of break lines 42 and 44, i.e. decreasing the length of the break lines while keeping the remaining parameters constant, passes signals of a higher frequency and vice versa. Increasing the area of the FSS while keeping the remaining parameters constant has no appreciable effect on the frequency of the waves passing through the FSS; however it increases the magnitude of the signal passing through the FSS and vice versa. Increasing the length of the uncoated segments 46 of the break lines 42 and 44 while keeping the remaining parameters constant, passes signals of lower frequencies and vice versa. Increasing the width of the uncoated segments 46 within a range of 30–120 microns while keeping the remaining parameters constant, has minimal effect on the signals passing through the FSS. Increasing the spacing between adjacent segments 46 of a break line while keeping the remaining parameters constant passes, wavelengths of a higher frequency and vice versa.

As can be appreciated by those skilled in the art, changing the parameters of the FSS can change the frequency and the magnitude of the signal that will pass through the FSS; however, the change can include a change in the range of frequency and magnitude of the signal which can include the frequency and/or magnitude of the previous signal or overlap the range of the frequency and/or magnitude of the prior signal. As can further be appreciated by those skilled in the art, rotating the FSS pattern while keeping all the other dimensions constant changes the polarity of the signal that will pass through the FSS.

In one nonlimiting embodiment of the invention, the minimum distance between the center break line and the next adjacent break line is at least 0.5 mm, for example 1.0 mm or 1.5 mm. The minimum distance between adjacent break lines as the lines move outward from the center break line can remain constant, can increase or decrease. In addition, the change in minimum distance can be uniform or nonuniform. In one nonlimiting embodiment of the invention, the minimum distance between adjacent break lines increase according to a Gaussian distribution.

It should be appreciated that although the minimum distance between adjacent break lines in the nonlimiting embodiments of the invention shown in FIGS. 2 and 3 is at the midpoint of the break lines, it is contemplated that other configurations can be used wherein the minimum distance between adjacent break lines is at a different location on the break lines.

In the practice of the invention, FSS pattern designs to pass a signal of a predetermined frequency and magnitude or predetermined range of frequencies and magnitude can be determined empirically by making an FSS, or using commercially available computer programs to design the FSS, with the former being more exact. Without limiting the invention thereto, the following Samples 1–3 are particulars of FSS patterns of the type shown in FIG. 3. A sputter deposited, electrically conductive coating of the type disclosed in European Patent Application No. 00939609.4 having two silver films separated by dielectric films was applied to a piece of clear, not colored, float glass having a thickness in the of 2.1 to 2.3 millimeters ("mm"). A laser was used to form a FSS pattern in the coating. With reference to FIG. 3, the aperture of Sample 1 had a length of 150 mm, and a height of 100 mm. The center break line 51 was equally spaced from the lateral sides of the aperture. The radius of curvature of the break line 50 and 52 farthest from the center break line 51 was 35 mm, and the radius of curvature of the break line 50 and 52 closest to the center break line 51 was 125 mm. The minimum distance between the center break line 51 and the break line 50 closest to the center break line 51, and the center break line 51 and the break line 52 closest to the center break line 51 was 1 mm. The minimum distance between adjacent break lines 50 and adjacent break lines 52 farthest from the center break line was 1.7 mm, with the change in minimum distance of the break lines 50 and the break lines 44 as they approach the center line 51 based on a Gaussian distribution. The break lines 50 and 52 and the center break line 51 were each 100 microns wide.

The size of the aperture of Sample 2 was the same as the aperture of Sample 1. The FSS pattern of Sample 2 was similar to the FSS pattern of Sample 1 with the following differences. With continued reference to FIG. 2, the radius of curvature of the break line 50 and 52 farthest from the center break line 51 was 280 mm, and the radius of curvature of the break line 50 and 52 closest to the center break line 51 was 1250 mm. The minimum distance between adjacent break lines 50 and adjacent break lines 52 farthest from the center break line was 2.4 mm.

The size of the aperture of Sample 3 was the same as the aperture of Sample 1. The FSS pattern of Sample 3 was similar to the FSS pattern of Sample 1 with the following differences. With continued reference to FIG. 2, the minimum distance between adjacent break lines 50 and adjacent break lines 52 farthest from the center break line was 1.5 mm.

Although not required in the present invention, in the particular embodiments disclosed in Samples 1 to 3, the minimum distance between adjacent break lines was located generally at the midpoint of the break line.

With reference to FIG. 4, there is shown enhanced communication window 28 having nonlimiting FSS or FSS pattern 70 incorporating features of the invention. The FSS pattern 70 includes a plurality of spaced linear columns 72, e.g. vertical columns 72 as shown in FIG. 4. Each column 72 as shown in FIG. 4 and insert FIG. 4A includes one set of a plurality of vertically aligned spaced discrete coated areas 74 bound by voids or passing areas 76 in the coating 18. The invention is not limited to the spacing between the vertical columns 72, the number and/or dimensions of the coated areas 74, or the dimensions of the voids 76.

With reference to FIGS. 5 and 5A, there is shown communication window 28 having nonlimiting FSS or FSS pattern 80 incorporating features of the invention. The FSS pattern 80 includes a plurality of spaced linear columns 82, e.g. vertical columns 82 as shown in FIG. 5. Each column 82 as shown in FIG. 5 and insert FIG. 5A includes two sets of a plurality of vertically aligned coated areas 84 separated by voids or passing areas 85 in the coating 18.

The discussion above regarding the depth of the uncoated segments 46 of the FSS pattern 34 and the uncoated break lines 50, 51 and 52 of the FSS pattern 49 are applicable to the uncoated voids 76 and 85 of the FSS patterns 70 and 80, respectively.

A portion of the coating 18 is between each of the columns 72 and 82 shown in FIGS. 4 and 5 respectively, to provide a current path through the FSS patterns 70 and 80 to heat the FSS when the coating 18 is powered while minimizing hot spots around the aperture of the communication window and to minimize differences in visible light transmission between the FSS pattern and the coating around the communication window. As can be appreciated, the invention is not limited to the number of vertical columns having the discreet spaced coated areas, the spacing between the columns, the number of coated areas in the columns and the dimensions of the coated areas.

As can now be appreciated each column can include any number of coated areas, e.g. one, two, three or more in the horizontal and/or in the vertical direction. Further the invention contemplates having the aperture of the communication window completely filled with spaced coated areas.

Although not limiting to the invention, in one nonlimiting embodiment, bus bars are positioned above and below the FSS patterns 70 and 80 shown in FIGS. 4 and 5, respectively, for the current to flow between the columns. However as can be appreciated, the invention contemplates any orientation between the bus bars and the FSS 70 and 80, e.g. a bus bar can be to the left and right of the FSS patterns 70 and 80 shown in FIGS. 4 and 5, respectively.

The signals passing through the FSS patterns of the types shown in FIGS. 4 and 5 are a function of the spacing between the columns, the vertical and horizontal spacing between coated areas in a column; the area of the coated areas as a function of the length and width of the coated area. Due to the complexity of the patterns, the frequency response is difficult to predict; however, it is believed that the following interaction between parameters can be expected. Increasing the distance between the columns while keeping the remaining parameters constant, passes waves of a higher frequency, and vice versa. Increasing the vertical spacing between the coated areas while keeping the remaining parameters constant, passes waves of a lower frequency, and vice versa. Increasing the length and width of the aperture of the communication window increases the magnitude but not necessarily the frequency response, and vice versa. As can be appreciated, increasing the height and width of the aperture provides more latitude in placement of the device to be used.

As discussed above in the practice of the invention, FSS pattern designs to pass a signal of a predetermined frequency and magnitude or predetermined range of frequencies and magnitude can be determined empirically by making an FSS, or using commercially available computer programs to design the FSS, with the former being more exact. Without limiting the invention thereto, the following Samples 4 to 6 are particulars of FSS patterns of the type shown in FIGS. 4 and 5. A coated piece of glass of the type used to make Samples 1 to 3 was provided and FSS patterns of the type shown in FIGS. 4 and 5 were made in the coating using a laser formed in the coating.

With reference to FIG. 4, aperture of the communication window of Sample 4 had a length of 150 millimeters ("mm") and a height of 100 mm. The columns were spaced 1 mm from one another and had a width of 1 mm. The coated area 74 was surrounded by the uncoated area 76 with sides of the coated area 74 spaced 100 microns on each side from an adjacent coated area 74 and the coating 18 between the columns. The size of the aperture of Sample 4 was the same size as the aperture for Sample 5 and the FSS pattern of Sample 5 was similar to the FSS pattern of Sample 4 except the columns 72 were spaced 2 mm from one another.

The size of the aperture of Sample 6 was the same size as the aperture for Sample 1. With reference to FIG. 5, the FSS pattern the columns 82 were spaced 2 mm apart. The columns had a width of 2 mm, and each had two sub columns having coated areas 84 surrounded by uncoated areas 85. The edges of the coated areas 84 were spaced from adjacent coating, e.g. adjacent coated areas 84 on three sides and the coating 18 on one side, a distance of 100 microns.

With reference to FIGS. 6 and 7, there is shown the magnitude of radio signals calibrated with respect to the glass in decibels (dB) at 2–18 gigahertz (GHz) passing through Samples 4–6. The graph of FIG. 6 is the performance of Samples 4–6 when the signal is perpendicular, i.e. horizontal to the current flow through the FSS pattern, and the graph of FIG. 7 is the performance of Samples 4–6 when the signal is parallel, i.e. vertical to the current flow through the FSS pattern. From the graphs of FIGS. 6 and 7, it is noted that the FSS patterns of Samples 4–6 have a generally more uniform signal magnitude when the signal is perpendicular (FIG. 6) and have a more varied and lower signal when the signal is parallel (FIG. 7).

As can be appreciated, the columns 72 and 82 of the FSS patterns 70 and 80, respectively, can have an arcuate shape instead of the linear shape shown in FIGS. 4 and 5, e.g. the columns can be substituted for the curved deletion lines 42 and 44 of the FSS pattern 34 shown in FIG. 2 and the curved deletion lines 50 and 52 of the FSS pattern 49 shown in FIG. 3.

Referring back to FIG. 1, the coating is a continuous coating having the communication window of the invention. As can now be appreciated by those skilled in the art, using the communication window of the invention reduces the intensity of the hot and cold spots around the communication window. Also as noted above, there are deletion areas in the FSS and hot spots of a lower intensity can be observed. These hot spots of lower intensity can be further reduced by providing deletion lines or break lines around the communication window, e.g. as disclosed in above-mentioned U.S. patent application Ser. No. 10/264,106 filed Oct. 3, 2002 in the name of Charles S. Voeltzel for "Heatable Article Having a Configured Heating Member" and as shown in FIG. 8.

More particularly, FIG. 8 illustrates another nonlimiting embodiment of the present invention wherein electrically conductive coating 18 extends between the bus bars 22 and 24 and communication window 28 is provided in the coating 18 in any usual manner, e.g. by a laser. A plurality of deletion lines 100, i.e. deletions in the coating at least through the conductive films of the coating, are provided in the coating, e.g. by a laser, around the communication window 28. Although not limiting to the invention, the deletion lines 100 are spaced from one another above and below the communication window 28 as shown in FIG. 8. As the path of the deletion lines 100 approach the communication window 28 from the upper bus bar 22 as viewed in FIGS. 1 and 8, the path of the deletion line 100 goes around the communication window 28, and the spacing between adjacent deletion lines 100 is different depending on the closeness of the deletion lines 100 to the communication window 28. For example, the spacing between adjacent deletion lines 100 near the communication window 28 is less than the spacing between adjacent deletion lines 100 more distant from the communication window 28. In this manner, as the distance from the communication window 28 increases, the deletion lines 100 become vertically straighter as shown in FIG. 8. Providing smaller conductive areas by using deletion lines, e.g. deletion lines 100 reduces the intensity of the hot spots around the communication window 28 because increasing the resistance of the current path, e.g. making the path narrower decreases the current flow.

Although not limiting to the invention, the deletion lines 100 can be provided as follows. Using a laser, a break line deletion is made extending from the top bus bar 22 to the center of the topside of the communication window 28 and from the bottom bus bar 24 to the center of the bottom or opposite side of the communication window 28. Vertically oriented spaced lines are provided on each side of the center line extending from the top bus bar toward the bottom bus bar and from the bottom bus bar toward the top bus bar for a distance equal to about the length of the communication window 28. Interconnecting lines are drawn around the sides of the communication window 28 to interconnect each top line with a corresponding bottom line. As the distance from the communication window 28 increases the interconnecting lines become straighter. Additional vertical lines extending between the bus bars can be provided as shown in FIG. 8. As can be appreciated any number of deletion lines 100 can be used. The more deletion lines and reduced space between the deletions lines, the more reduction in hot spots and intensity of hot spots is realized.

The discussion is now directed to fabricating a heatable windshield of the type shown in FIG. 1 incorporating features of the invention. As is appreciated, the invention is not limited thereto.

A communication window having a frequency selective surface of the invention is provided in a sputtered heatable coating in any manner, e.g. but not limiting to the invention by using a laser, to provide the break lines. Since the process of sputter depositing coatings and making patterns using a laser are not limiting to the invention and are well known in the art, the sputtering process, the sputtered coating and using a laser to make break lines will not be discussed in more detail.

The coated sheet 14 is positioned over another glass sheet 12 having a black band (not shown) of ceramic paste silk screened on the marginal edge of the inner surface of the outer sheet, e.g. sheet 12, to provide UV protection for the underlying adhesive securing the windshield in position in the automotive body. The sheet 14 having the conductive coating 18 with the communication window 28 having an FSS pattern of the invention and the sheet 12 are shaped and annealed. Since the process of shaping and annealing of blanks for automotive windshields is well known in the art and is not limiting to the invention, the processes will not be discussed in more detail.

An interlayer composite 20 disclosed in the above-mentioned U.S. patent application Ser. No. 10/201,863, filed on Jul. 24, 2002, is used to laminate the glass sheets and bus bars together; however, as will be appreciated, the invention is not limited thereto. More particularly, in the instance when the coating is to be used as a solar control coating, there is no need for bus bars and leads to provide external electrical access to the bus bars between the sheets. Since the joining of the glass sheets by a plastic sheet or by the composite interlayer is not limiting to the invention, no further discussion will be made.

The top bus bar 22 and the bottom bus bar 24 are each contiguous with its respective lead 110 of the lead assemblies. Since the bus bars and leads providing external access to leads is not limiting to the invention, reference to the above application should be made for a detailed discussion of the lead assembly 26.

The interlayer composite 20 is positioned on the shaped sheet 14 with the bus bars in electrical contact with the coating 18. The shaped sheet 12 is placed over the composite 20. A vacuum ring of the type used in the manufacture of laminated windshields is positioned over the periphery of the assembly (the interlayer composite 20 positioned between the sheets 12 and 14 as discussed above) and vacuum of about 20 to 28 inches of mercury is pulled, and the windshield subassembly having the vacuum applied is place in an oven set at 260° F. (126.7° C.) for 15 minutes to heat the subassembly to a temperature of 225° F. (127.2° C.). While the windshield subassembly is in the oven, the vacuum is continuously pulled through the channel to pull air from between the sheets. The heat and vacuum sealed the marginal edges of the windshield subassembly. Thereafter, the edge sealed windshield subassembly is placed in an air autoclave and laminated. Since the process of edge sealing and autoclaving process used in the manufacturing of laminated automotive windshields are well known in the art and are not limiting to the invention, the processes are not discussed in detail.

As can be appreciated by those skilled in the art of laminating, the edge sealing of the subassembly and laminating of the edge sealed subassembly is not limiting to the invention. For example, the subassembly can be sealed using nipper rollers or bagging the subassembly, and the edge sealed subassembly can be laminated by oil autoclaving.

As can be appreciated, the outer surface of the windshield can be provided with a photocatalytic coating to keep the surface clean such as the type disclosed in U.S. Pat. No. 6,027,766, or a hydrophobic coating of the type sold by PPG Industries Inc. under the trademark AQUAPEL and disclosed in U.S. Pat. No. 5,523,162, which patents are hereby incorporated by reference.

As can be appreciated, the invention is not limited to the above examples that were present for illustration purposes only. The particular embodiments described in detail herein are illustrative only and are not limiting to the scope of the invention, which is to be given the full breadth of the appended claims and any and all equivalents thereof.

What is claimed is:

1. An article having a communication window comprising:
   a substrate having a major surface, the major surface having a portion to block out at least one predetermined wavelength of an electromagnetic spectrum and a portion of the major surface outlined by an imaginary boundary defined as an aperture, the aperture having a frequency selective surface pattern defined by an area that passes the at least one predetermined wavelength of the electromagnetic spectrum, defined as a passing area, and an area that blocks out the at least one predetermined wavelength of the electromagnetic spectrum, defined as a blocking area, wherein the frequency selective surface pattern comprises:
   a plurality of spaced columns, each column defined by a first boundary line spaced from a second boundary line and having a plurality of blocking areas between the first and second boundary lines of the column, the blocking areas spaced from one another by a passing area, and the column having a first at least one passing area between the blocking areas and the first boundary, and a second at least one passing area between the blocking areas and the second boundary, and each of the columns separated by a blocking area.

2. The article according to claim 1, wherein the blocking area between columns is continuous from a first location on the imaginary boundary and in contact with the portion of the major surface to block out the at least one predetermined wavelength of the electromagnetic spectrum to a second location on the imaginary boundary and in contact with the portion of the surface to block out the at least one predetermined wavelength of the electromagnetic spectrum, with the first location spaced from the second location.

3. The article according to claim 1, wherein at least one column of the plurality of columns includes at least two subcolumns, each subcolumn having a plurality of blocking areas separated by passing areas, with the blocking areas of one subcolumn spaced from the blocking areas of the other subcolumn by at least one passing area and the blocking areas of one subcolumn spaced from the first boundary of the at least one column by the first at least one passing area and the blocking areas of the other subcolumn spaced from the second boundary of the at least one column by the second at least one passing area.

4. The article according to claim 1, wherein the article is a transparency for use on an enclosure of the type selected from a residential home, a commercial building, a space vehicle, an air vehicle, a land vehicle, an over the water vehicle, an under the water vehicle, a refrigerator door having a window, an oven door having a window, a microwave door having a window, and combinations thereof.

5. The article according to claim 4, wherein outer major surface of the transparency includes a hydrophobic coating and/or a photocatalytic coating.

6. The article according to claim 4 wherein the article is a transparency for an automobile selected from a windshield, a side window, a back window, a moon roof, and combinations thereof, and the major surface has a coating comprising a metal film and at least one dielectric film.

7. The article according to claim 6 wherein the article is an automotive windshield.

8. The article according to claim 7 wherein the metal film of the coating is a silver film and the coating is selected from a solar control coating, an electrically heatable coating, and combinations thereof, and the passing areas extend at least through the metal film of the coating.

9. The article according to claim 8 wherein the coating is on the major surface of the substrate, the substrate is a first glass sheet and the communication window is in a predetermined location in the coating and further including a second glass sheet having a major surface and a plastic interlayer between the major surface of the first sheet and the major surface of the second sheet, securing the first and second sheets together.

10. The article according to claim 9 wherein the coating blocks out at least one predetermined wavelength of the electromagnetic spectrum, the blocking area between the columns and the passing areas is continuous from a first location on the imaginary boundary and in contact with the coating outside the imaginary boundary to a second location on the imaginary boundary and in contact with the coating outside the imaginary boundary, with the first location spaced from the second location.

11. The article according to claim 10, wherein the dielectric film of the coating is above the silver film and further comprising a dielectric film below the silver film.

12. The article according to claim 11, wherein the silver film is a first silver film and further comprising a second silver film over the dielectric film over the first silver film and a dielectric film over the second silver film.

13. The article according to claim 12, further including a pair of spaced bus bars between the sheets and in electrical contact with the coating, a first lead contacting one of the bus bars and a second lead contacting the other bus bar to provide external electrical contact to the bus bars.

14. The article according to claim 13, wherein the first lead and the second lead extend out from a peripheral edge of the windshield to provide external electrical contact to the bus bars.

15. The article according to claim 13, wherein an outer major surface of one of the glass sheets includes a hydrophobic coating and/or a photocatalytic coating.

16. The article according to claim 13, wherein the communication window has a rectangular shape having a length of 150 mm, and a height of 100 mm, and the frequency selective surface is selected from one of the following groups:
   Group 1: the columns are spaced 1 mm apart, the columns have a width of 1 mm, the blocking areas within the columns are spaced from each other a distance of 100 microns, and spaced from the blocking area between the columns a distance of 100 microns;
   Group 2: the columns are spaced 2 mm apart, the columns have a width of 1 mm, the blocking areas within the columns are spaced from each other a distance of 100 microns, and spaced from the blocking area between the columns a distance of 100 microns; and
   Group 3: the columns are spaced 2 mm apart, the columns have a width of 2 mm, and each column has two subcolumns having the blocking areas surrounded by passing areas, the blocking areas are spaced from adjacent blocking areas a distance of 100 microns.

17. The article according to claim 13, wherein the blocking area between the columns is oriented to be generally parallel to the direction of current flow between the bus bars.

18. The article according to claim 17, wherein at least one of the glass sheets or the plastic interlayer has a portion in cross section having a wedged shape.

19. The article according to claim 17 further including:

a first plurality of deletion lines in the coating spaced from one another and extending from one bus bar defined as a first bus bar toward the communication window;

a second plurality of deletion lines in the coating spaced from one another and extending from the other bus bar defined as a second bus bar toward the communication window, with the first and second plurality of deletion lines generally aligned with one another; wherein selected ones of the first plurality of deletion lines and selected ones of the second plurality of deletion lines have a path around one side of the communication window defined as the first side and are in contact with one another to provide continuous spaced current paths from the first bus bar to the second bus bar around the first side of the communication window and selected ones of the first plurality of deletion lines and selected ones of the second plurality of deletion lines have a path around opposite side of the communication window, defined as the second side, and are in contact with one another to provide continuous spaced current paths from the first bus bar to the second bus bar around the second side of the communication window.

20. An article having a communication window comprising:

a substrate having a major surface, the major surface having a portion to block out at least one predetermined wavelength of an electromagnetic spectrum and a portion of the major surface outlined by an imaginary boundary defined as an aperture, the aperture having a frequency selective surface pattern defined by an area that passes the at least one predetermined wavelength of the electromagnetic spectrum, defined as a passing area, and an area that blocks out the at least one predetermined wavelength of the electromagnetic spectrum, defined as a blocking area, wherein the frequency selective surface pattern comprises:

a plurality of columns, each column having a plurality of passing areas separated by blocking areas, each passing area having a perimeter with a blocking area within the perimeter, and each of the columns are separated by a blocking area, and at least one column includes at least two subcolumns, each subcolumn having a plurality of passing areas separated by blocking areas, with the blocking areas and passing areas of adjacent subcolumns in contact with one another and the blocking areas within the perimeter of the passing areas spaced from one another.

21. An article having a communication window, wherein the article is an automotive windshield comprising:

a substrate having a major surface, the major surface having a portion to block out at least one predetermined wavelength of an electromagnetic spectrum and a portion of the major surface outlined by an imaginary boundary defined as an aperture, the aperture having a frequency selective surface pattern defined by an area that passes the at least one predetermined wavelength of the electromagnetic spectrum, defined as a passing area, and an area that blocks out the at least one predetermined wavelength of the electromagnetic spectrum, defined as a blocking area;

a coating comprising a silver film on the major surface of the substrate, the coating selected from a solar control coating, an electrically heatable coating, and combinations thereof with the passing areas extending at least through the silver film of the coating, and the frequency selective surface pattern comprising:

a plurality of columns, each column having a plurality of passing areas separated by blocking areas, each passing area having a perimeter with a blocking area within the perimeter, and each of the columns are separated by a blocking area.

22. The article according to claim 21, wherein the substrate is a first glass sheet, further comprising a second glass sheet and a plastic interlayer securing the second sheet to the major surface of the first sheet, and at least one of the glass sheets or the plastic interlayer has a portion in cross section having a wedged shape.

* * * * *